(12) United States Patent
Seguchi

(10) Patent No.: US 10,250,175 B2
(45) Date of Patent: Apr. 2, 2019

(54) FIELD WINDING SYNCHRONOUS MACHINE DRIVE SYSTEM

(71) Applicant: DENSO CORPORATION, Kariya, Aichi-pref. (JP)

(72) Inventor: Masahiro Seguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 1 day.

(21) Appl. No.: 15/383,439

(22) Filed: Dec. 19, 2016

(65) Prior Publication Data

US 2017/0179864 A1 Jun. 22, 2017

(30) Foreign Application Priority Data

Dec. 21, 2015 (JP) ................. 2015-248534

(51) Int. Cl.
*H02P 25/03* (2016.01)
*H01K 1/26* (2006.01)
(Continued)

(52) U.S. Cl.
CPC .......... *H02P 25/03* (2016.02); *H02K 1/146* (2013.01); *H02K 1/26* (2013.01); *H02K 3/28* (2013.01); *H02K 19/10* (2013.01); *H02K 19/12* (2013.01); *H02P 9/14* (2013.01); *H02P 9/38* (2013.01); *H02P 25/22* (2013.01); *H02P 27/06* (2013.01); *H02K 11/33* (2016.01); *H02K 2213/12* (2013.01)

(58) Field of Classification Search
CPC .......... H02K 1/24; H02K 9/19; H02K 3/527; H02K 3/20; H02K 11/042; H02K 16/04; H02K 3/487; H02K 11/04; H02K 37/02; H02K 19/26; H02P 27/08; H02P 6/08
See application file for complete search history.

(56) References Cited

U.S. PATENT DOCUMENTS 6,710,495 B2 * 3/2004 Lipo .................. H02K 3/28
310/184
2008/0079375 A1 4/2008 Seguchi
(Continued)

FOREIGN PATENT DOCUMENTS

| JP | 2010-022185 A | 1/2010 |
| JP | 2015-015846 A | 1/2015 |
| JP | 2016-214035 A | 12/2016 |

*Primary Examiner* — Eduardo Colon Santana
*Assistant Examiner* — Said Bouziane
(74) *Attorney, Agent, or Firm* — Oliff PLC

(57) ABSTRACT

A field winding synchronous machine drive system includes a field winding synchronous machine having a stator and a rotor and a drive apparatus configured to drive the field winding synchronous machine. The stator has N m-phase stator coils wound on a stator core to create a rotating magnetic field, where N is an integer not less than 2 and m is an integer not less than 3. The rotor has at least one main field winding wound on a rotor core to create field magnetic flux. The drive apparatus includes N inverters each of which supplies m-phase alternating current to a corresponding one of the N m-phase stator coils. Specifically, each of the inverters supplies the corresponding m-phase stator coil with the m-phase alternating current which includes a fundamental-wave current and a time-harmonic current superimposed on the fundamental-wave current; the time-harmonic current has a shorter period than the fundamental-wave current.

15 Claims, 12 Drawing Sheets

(51) Int. Cl.
*H02P 25/22* (2006.01)
*H02K 1/14* (2006.01)
*H02K 1/26* (2006.01)
*H02P 27/06* (2006.01)
*H02K 19/12* (2006.01)
*H02K 3/28* (2006.01)
*H02K 19/10* (2006.01)
*H02P 9/14* (2006.01)
*H02P 9/38* (2006.01)
*H02K 11/33* (2016.01)

(56) References Cited

U.S. PATENT DOCUMENTS

| | | | | |
|---|---|---|---|---|
| 2008/0103632 A1* | 5/2008 | Saban | H02K 3/28 | 700/286 |
| 2009/0251096 A1* | 10/2009 | Schulz | H02P 6/10 | 318/801 |
| 2010/0052585 A1* | 3/2010 | Bonvin | G11B 19/20 | 318/400.17 |
| 2014/0285057 A1* | 9/2014 | Aoyama | H02K 3/28 | 310/210 |
| 2015/0194855 A1 | 7/2015 | Kubo et al. | | |
| 2016/0105062 A1* | 4/2016 | Aoyama | H02K 19/12 | 310/51 |

* cited by examiner

CANCELLATION PHASE SHIFT OF 180° (ANTIPHASE)
REFERENCE WAVE

CANCELLATION PHASE SHIFT OF 180° (ANTIPHASE)
CANCELLATION WAVE

CANCELLATION PHASE SHIFT OF 180° (ANTIPHASE)
RESULTANT WAVE

CANCELLATION PHASE SHIFT OF 210°
REFERENCE WAVE

FIELD WINDING SYNCHRONOUS MACHINE DRIVE SYSTEM

CROSS-REFERENCE TO RELATED APPLICATION

This application is based on and claims priority from Japanese Patent Application No. 2015-248534 filed on Dec. 21, 2015, the content of which is hereby incorporated by reference in its entirety into this application.

BACKGROUND

1. Technical Field

The present invention relates to drive systems for driving field winding synchronous machines that are used in, for example, motor vehicles as electric motors, electric generators and motor-generators.

2. Description of Related Art

Conventionally, there have been known various synchronous machines used in motor vehicles. These synchronous machines generally include a stator and a rotor. The stator includes a stator core and a stator coil wound on the stator core. The stator coil is comprised of a plurality of phase windings that together create a rotating magnetic field. The rotor is rotatably disposed so as to radially face the stator through an electromagnetic gap formed therebetween.

For example, Japanese Patent Application Publication No. JP2015015846A discloses a field winding synchronous machine that includes a rotor. The rotor includes a rotor core having a plurality of main poles and a plurality of auxiliary poles formed therein, a plurality of main field windings that are wound respectively on the main poles of the rotor core and connected in series with each other, and a plurality of excitation windings that are wound respectively on the auxiliary poles of the rotor core and connected in series with each other. In the field winding synchronous machine, torque is generated by exciting the main field windings by causing excitation magnetic flux to directly cross the main poles of the rotor core.

However, in the field winding synchronous machine disclosed in the above patent document, the main field windings of the rotor are excited by time harmonics superimposed on electric current supplied to the stator coil and harmonic components of the stator magnetic field caused by a magnetic circuit; and torque is generated by the field current and the stator current. Consequently, torque ripple is caused by the harmonic components.

SUMMARY

According to exemplary embodiments, there is provided a field winding synchronous machine drive system which includes a field winding synchronous machine and a drive apparatus. The field winding synchronous machine includes a stator and a rotor. The stator includes a stator core and N m-phase stator coils wound on the stator core to create a rotating magnetic field, where N is an integer greater than or equal to 2 and m is an integer greater than or equal to 3. The rotor includes a rotor core and at least one main field winding wound on the rotor core to create field magnetic flux. The drive apparatus is configured to drive the field winding synchronous machine. The drive apparatus includes N inverters each of which supplies m-phase alternating current to a corresponding one of the N m-phase stator coils. Specifically, each of the inverters supplies the corresponding m-phase stator coil with the m-phase alternating current which includes a fundamental-wave current and a time-harmonic current superimposed on the fundamental-wave current; the time-harmonic current has a shorter period than the fundamental-wave current.

With the above configuration, it is possible to suitably set the phase differences between the time-harmonic currents included in the respective m-phase alternating currents, thereby causing them to be canceled by one another. Consequently, it is possible to reduce torque ripple caused by the time-harmonic currents included in the respective m-phase alternating currents.

In a further implementation, the m-phase alternating currents supplied respectively from the inverters to the corresponding m-phase stator coils are separately controlled. The time-harmonic currents included in the respective m-phase alternating currents are controlled in such phases as to be weakened by one another.

N may be equal to 2. Both of the time-harmonic currents included respectively in the two m-phase alternating currents may be in the form of a triangular wave. In this case, it is preferable that the phase shift of one of the two time-harmonic currents from the other of the two time-harmonic currents is in the range of greater than 90° and less than 270°.

Alternatively, with N being equal to 2, both of the time-harmonic currents included respectively in the two m-phase alternating currents may be in the form of a sine wave. In this case, it is preferable that the phase shift of one of the two time-harmonic currents from the other of the two time-harmonic currents is in the range of greater than 120° and less than 240°.

Preferably, a peak value of a resultant time-harmonic current of the N time-harmonic currents included respectively in the N m-phase alternating currents is lower than a peak value of each of the N time-harmonic currents.

The rotor core may have a plurality of main poles and a plurality of auxiliary poles formed therein. The main poles are formed to protrude toward the stator and circumferentially spaced from one another at a predetermined pitch in electrical angle. The auxiliary poles are formed to protrude toward the stator and circumferentially offset from the main poles by an electrical angle within a predetermined range which includes 90°. The rotor may include a plurality of main field windings and a plurality of excitation windings. The main field windings are wound respectively on the main poles of the rotor core and connected in series with each other to create the field magnetic flux. The excitation windings are wound respectively on the auxiliary poles of the rotor core and connected in series with each other to have excitation current induced therein by the time-harmonic currents included in the m-phase alternating currents. In this case, it is preferable that the excitation windings are connected with the main field windings via a bridge circuit.

It is further preferable that between the bridge circuit and the main field windings, there is connected a capacitor in parallel with the main field windings.

Moreover, it is preferable that between the bridge circuit and the main field windings, there is also connected a switch.

It is further preferable that the switch is configured to be turned on when the voltage across the capacitor exceeds a predetermined threshold voltage.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings.

DESCRIPTION OF EMBODIMENTS

Figure 1:
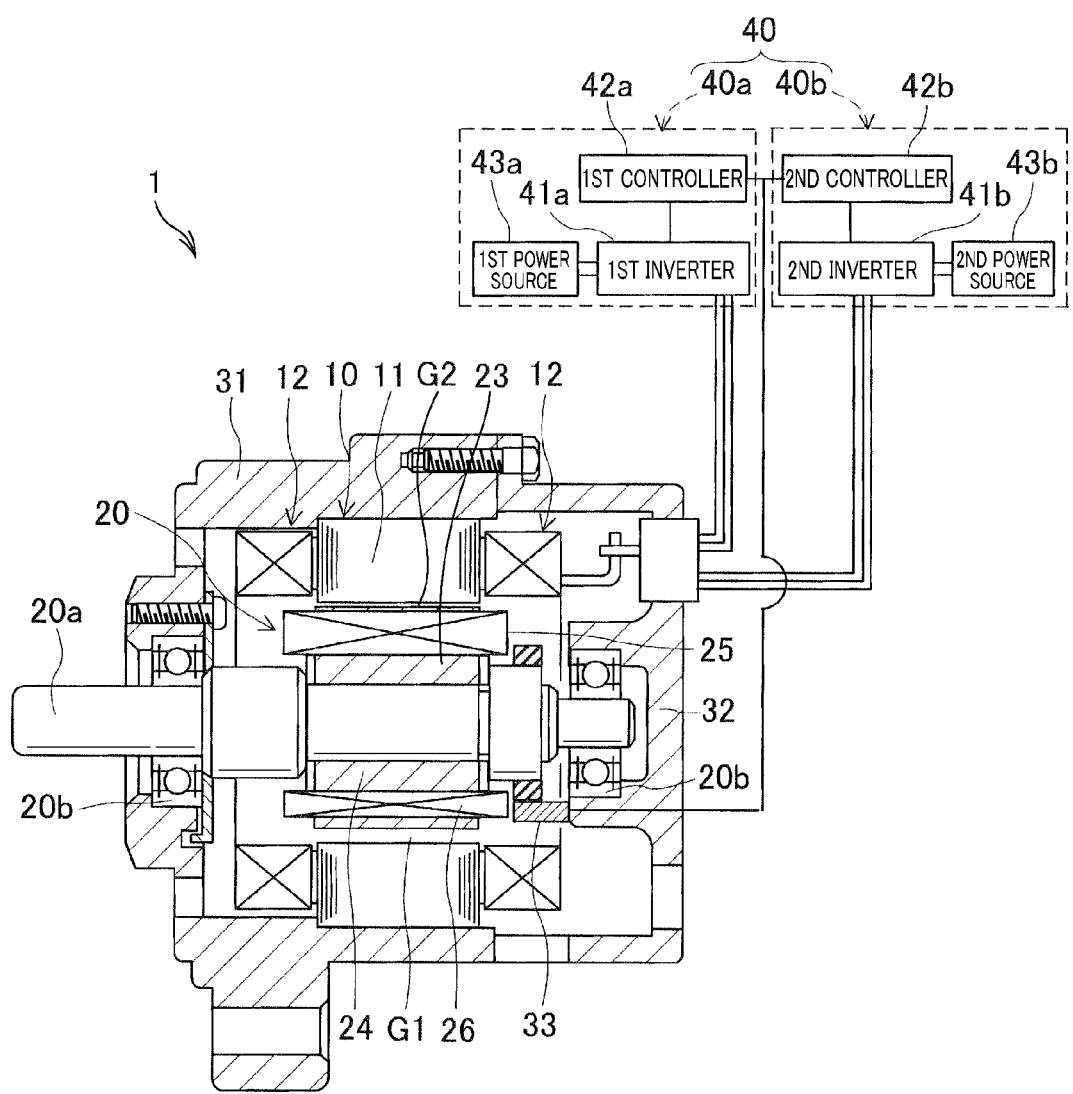
FIG. 1 is a schematic cross-sectional view illustrating the overall configuration of a field winding synchronous machine drive system according to a first embodiment.

Exemplary embodiments will be described hereinafter with reference to FIGS. 1-18. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

FIG. 1 shows the overall configuration of a field winding synchronous machine drive system according to a first embodiment. The field winding synchronous machine drive system is configured to drive a field winding synchronous machine 1.

In the present embodiment, the field winding synchronous machine 1 is configured as a motor-generator for use in a motor vehicle, such as a hybrid vehicle, an electric vehicle or a fuel cell vehicle.

As shown in FIG. 1, the field winding synchronous machine drive system according to the present embodiment mainly includes the field winding synchronous machine 1 and a drive apparatus 40 that drives the field winding synchronous machine 1.

The field winding synchronous machine 1 includes: a stator 10 that includes an annular stator core 11 and a three-phase stator coil 12 wound on the stator core 11; a rotor 20 that includes a rotor core 21 having a plurality of main poles 23 and a plurality of auxiliary poles 24 formed therein, a plurality of main field windings 25 wound respectively on the main poles 23 of the rotor core 21, a plurality of excitation windings 26 wound respectively on the auxiliary poles 24 of the rotor core 21, and a rotor shaft 20a; a pair of hollow cylindrical frames 31 and 32; and a position sensor 33.

Figure 2:
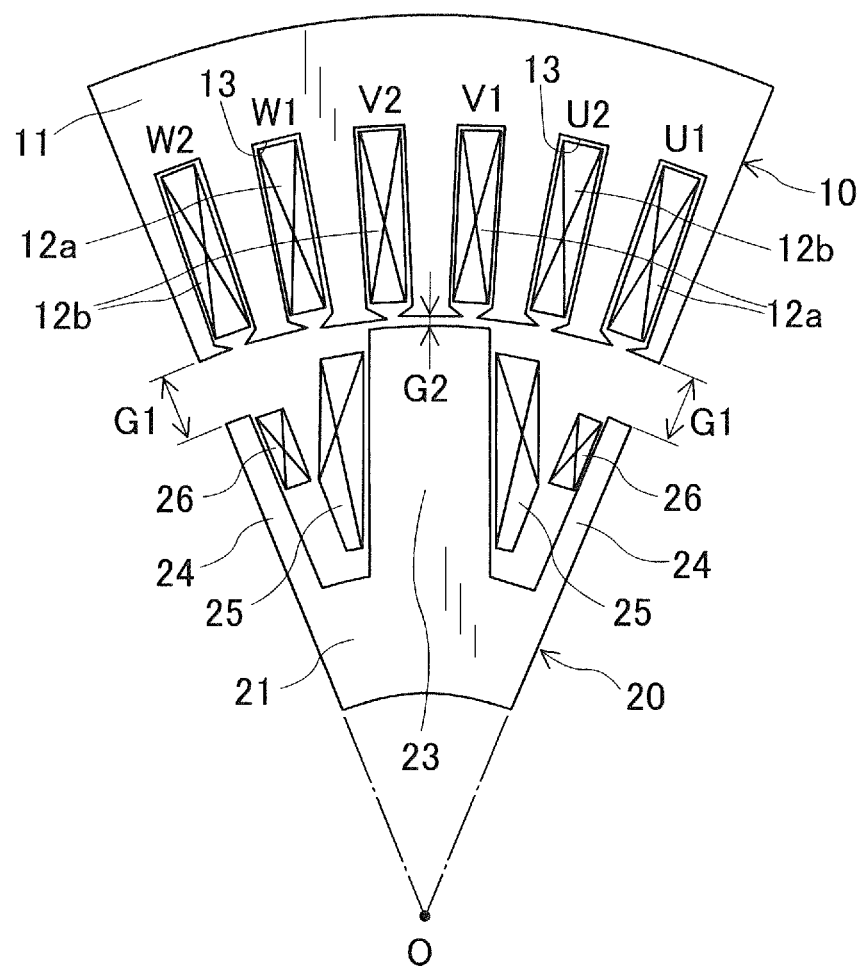
FIG. 2 is a schematic view showing part of a field winding synchronous machine according to the first embodiment, the part corresponding to one magnetic pole of a rotor of the field winding synchronous machine.

As shown in FIG. 2, the stator core 11 has a plurality of slots 13 arranged in a circumferential direction thereof. The stator coil 12 is distributedly wound in the slots 13 of the stator core 11. Referring back to FIG. 1, the stator 10 is received in the frames 31 and 32 with a radially outer periphery of the stator core 11 fixed to inner circumferential surfaces of the frames 31 and 32.

In the present embodiment, the number of the slots 13 formed in the stator core 11 per magnetic pole of the rotor 20 that has eight magnetic poles and per phase of the three-phase stator coil 12 is set to 2. That is, the slot multiplier number is set to 2. Accordingly, the total number of the slots 13 formed in the stator core 11 is equal to 48 (i.e., 2×8×3).

In the present embodiment, the stator coil 12 is comprised of two (i.e., n with n being equal to 2) three-phase (i.e., m-phase with m being equal to 3) stator coils, namely a first three-phase stator coil 12a and a second three-phase stator coil 12b.

Specifically, the first stator coil 12a is comprised of a U-phase winding U1, a V-phase winding V1 and a W-phase winding W1. Each of the U-phase, V-phase and W-phase windings U1, V1 and W1 is wound on the stator core 11 so as to be received in a predetermined number of slots 13 that are spaced from one another at a six-slot pitch. Similarly, the second stator coil 12b is comprised of a U-phase winding U2, a V-phase winding V2 and a W-phase winding W2. Each of the U-phase, V-phase and W-phase windings U2, V2 and W2 is wound on the stator core 11 so as to be received in a predetermined number of slots 13 that are spaced from one another at a six-slot pitch.

As shown in FIG. 1, the rotor shaft 20a is rotatably supported by the frames 31 and 32 via a pair of bearings 20b provided respectively in the frames 31 and 32. The rotor core 21 is fixedly fitted on the rotor shaft 20a so as to rotate together with the rotor shaft 20a.

As shown in FIG. 2, the rotor core 21 (or the rotor 20) is arranged radially inside and coaxially with the stator core 11 (or the stator 10) with a predetermined electromagnetic gap formed therebetween. In other words, a radially outer periphery of the rotor core 21 faces a radially inner periphery of the stator core 11 through the predetermined electromagnetic gap formed therebetween.

The rotor core 21 has a plurality of pairs (e.g., four pairs in the present embodiment) of the main poles 23 and a plurality of pairs (e.g., four pairs in the present embodiment) of the auxiliary poles 24 formed to protrude radially outward (i.e., toward the stator 10) from a radially outer surface of the rotor core 21.

The main poles 23 are circumferentially spaced from one another at a predetermined pitch in electrical angle. The main poles 23 constitute field magnetic poles so that field magnetic flux is transferred between the stator core 11 and the main poles 23.

The auxiliary poles 24 are circumferentially offset from the main poles 23 by an electrical angle within a predetermined range which includes 90°. More particularly, in the present embodiment, each of the auxiliary poles 24 is formed on the d axis between one circumferentially-adjacent pair of the main poles 23.

As shown in FIG. 2, in the present embodiment, distal ends (or radially outer ends) of the auxiliary poles 24 are located closer than distal ends (or radially outer ends) of the main poles 23 to the axis O of rotation of the rotor 20. In other words, the distal ends of the auxiliary poles 24 less protrude toward the stator 10 than the distal ends of the main poles 23. Consequently, electromagnetic gaps G1 between the auxiliary poles 24 and the stator 10 are greater than electromagnetic gaps G2 between the main poles 23 and the stator 10.

With the electromagnetic gaps G1 set to be greater than the electromagnetic gaps G2, it becomes difficult for magnetic flux $\phi$, which is caused by the ampere-turns (i.e., main current) of the stator coil 12, to flow to the auxiliary poles 24 located on the q-axis magnetic paths. Consequently, magnetic saturation of the auxiliary poles 24 is relaxed (or suppressed).

The main field windings 25 are wound respectively on the main poles 23 of the rotor core 21 and electrically connected in series with each other. On the other hand, the excitation windings 26 are wound respectively on the auxiliary poles 24 of the rotor core 21 and electrically connected in series with each other.

The position sensor 33 is arranged to face a radially outer periphery of a magnetic ring plate; the magnetic ring plate is fixed on the rotor shaft 20a and has a plurality of magnetic salient poles formed on the radially outer periphery thereof at a constant circumferential pitch. The position sensor 33 senses the rotational position of the rotor 20 by detecting the passing (or rotational movement) of the magnetic salient poles of the magnetic ring plate.

The above-described field winding synchronous machine 1 is driven by being controlled by the drive apparatus 40 that includes a first drive unit 40a and a second drive unit 40b.

Figure 3:
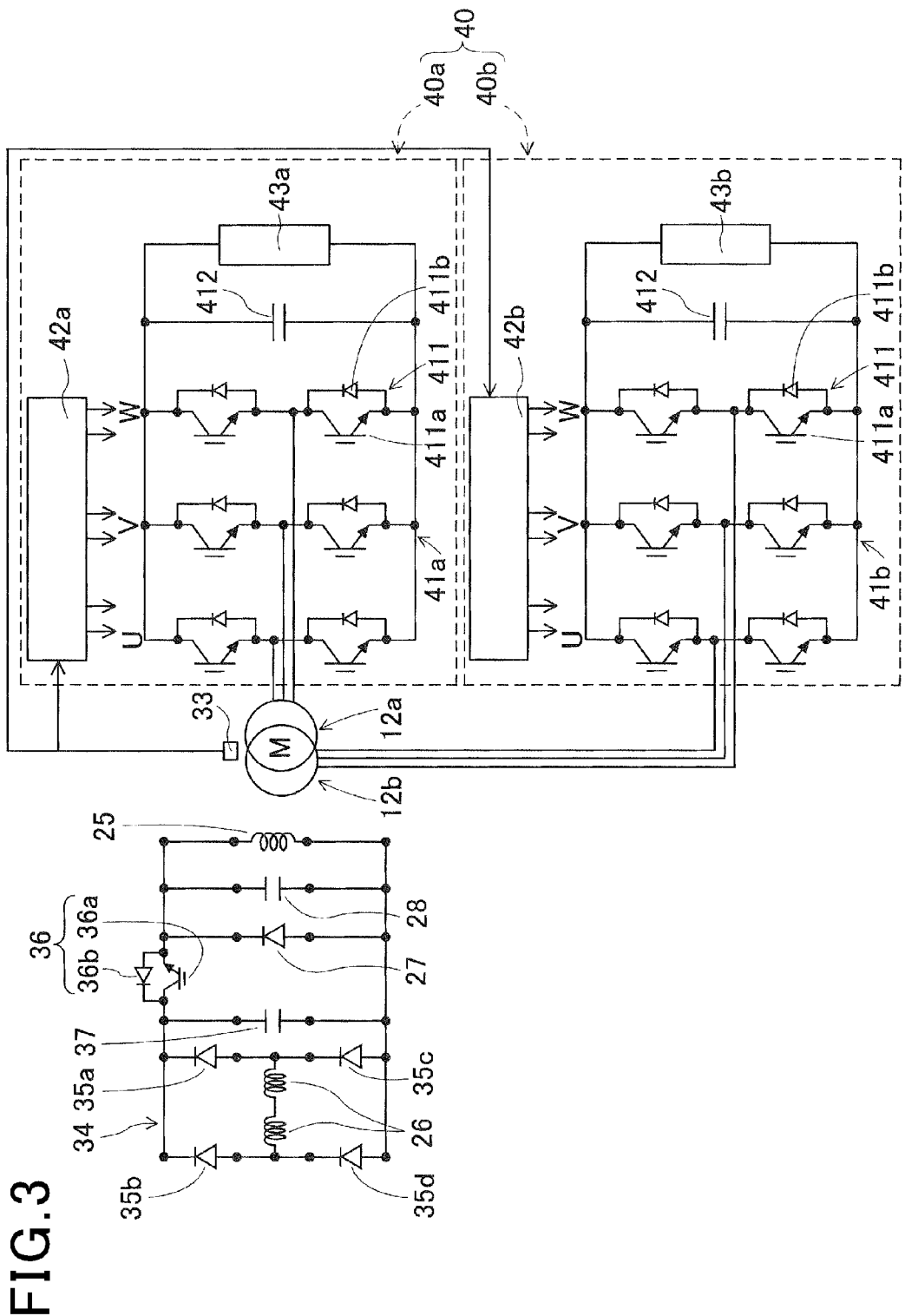
FIG. 3 is a schematic circuit diagram of the field winding synchronous machine drive system according to the first embodiment.

As shown in FIG. 3, the first drive unit 40a includes a first inverter 41a, a first controller 42a and a first electric power source 43a. The first drive unit 40a supplies first three-phase alternating current from the first inverter 41a to the first stator coil 12a that is comprised of the U-phase, V-phase and W-phase windings U1, V1 and W1 distributedly wound on the stator core 11. Similarly, the second drive unit 40b includes a second inverter 41b, a second controller 42b and a second electric power source 43b. The second drive unit 40b supplies second three-phase alternating current from the second inverter 41b to the second stator coil 12b that is comprised of the U-phase, V-phase and W-phase windings U2, V2 and W2 distributedly wound on the stator core 11. That is, in the present embodiment, the drive apparatus 40 includes the first and second (i.e., N which is equal to 2) inverters 41a and 41b for respectively supplying the first and second (i.e., N which is equal to 2) three-phase alternating currents to the first and second (i.e., N which is equal to 2) stator coils 12a and 12b.

The first inverter 41a of the first drive unit 40a applies, based on signals outputted from the position sensor 33 and the first controller 42a, the voltage of the first electric power source 43a to the first stator coil 12a so as to create a desired rotating magnetic field from the first stator coil 12a. Moreover, the first controller 42a intermittently controls the first inverter 41a to supply the first stator coil 12a with the first three-phase alternating current according to the rotational position of the rotor 20 sensed by the position sensor 33.

Figure 4:
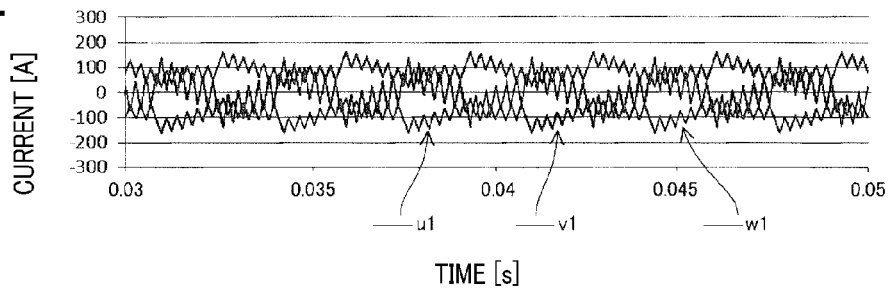
FIG. 4 is a waveform chart illustrating U-phase, V-phase and W-phase currents u1, v1 and w1 supplied respectively to U-phase, V-phase and W-phase windings of a first stator coil in the field winding synchronous machine drive system according to the first embodiment.

Specifically, as shown in FIG. 4, the first three-phase alternating current is comprised of U-phase, V-phase and W-phase currents u1, v1 and w1 supplied respectively to the U-phase, V-phase and W-phase windings U1, V1 and W1 of the first stator coil 12a. Each of the U-phase, V-phase and W-phase currents u1, v1 and w1 is obtained by superimposing a time-harmonic current on a fundamental-wave current; the time-harmonic current has a shorter period than the fundamental-wave current.

Similarly, the second inverter 41b of the second drive unit 40b applies, based on signals outputted from the position sensor 33 and the second controller 42b, the voltage of the second electric power source 43b to the second stator coil 12b so as to create a desired rotating magnetic field from the second stator coil 12b. Moreover, the second controller 42b intermittently controls the second inverter 41*b* to supply the second stator coil 12*b* with the second three-phase alternating current according to the rotational position of the rotor 20 sensed by the position sensor 33.

Figure 5:
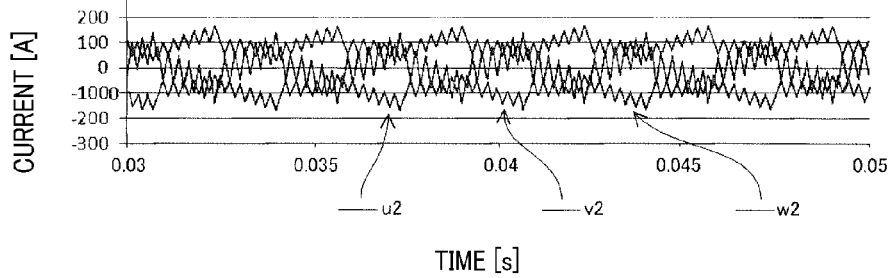
FIG. 5 is a waveform chart illustrating U-phase, V-phase and W-phase currents u2, v2 and w2 supplied respectively to U-phase, V-phase and W-phase windings of a second stator coil in the field winding synchronous machine drive system according to the first embodiment.

Specifically, as shown in FIG. 5, the second three-phase alternating current is comprised of U-phase, V-phase and W-phase currents u2, v2 and w2 supplied respectively to the U-phase, V-phase and W-phase windings U2, V2 and W2 of the second stator coil 12*b*. Each of the U-phase, V-phase and W-phase currents u2, v2 and w2 is obtained by superimposing a time-harmonic current on a fundamental-wave current; the time-harmonic current has a shorter period than the fundamental-wave current.

Moreover, in the present embodiment, the first and second three-phase alternating currents supplied respectively from the first and second inverters 41*a* and 41*b* to the first and second stator coils 12*a* and 12*b* are separately controlled. The time-harmonic components of the first three-phase alternating current and the time-harmonic components of the second three-phase alternating current are controlled in such phases as to be weakened by each other.

More particularly, in the present embodiment, all of the time-harmonic components of the first three-phase alternating current and the time-harmonic components of the second three-phase alternating current are in the form of a triangular wave. Moreover, the time-harmonic components of the first three-phase alternating current are in the cancellation phase of 180° (i.e., in antiphase) to the time-harmonic components of the second three-phase alternating current.

Consequently, the time-harmonic components of the first three-phase alternating current and the time-harmonic components of the second three-phase alternating current are canceled by each other, thereby reducing torque ripple caused by the time-harmonic components of the first and second three-phase alternating currents.

Figure 6:
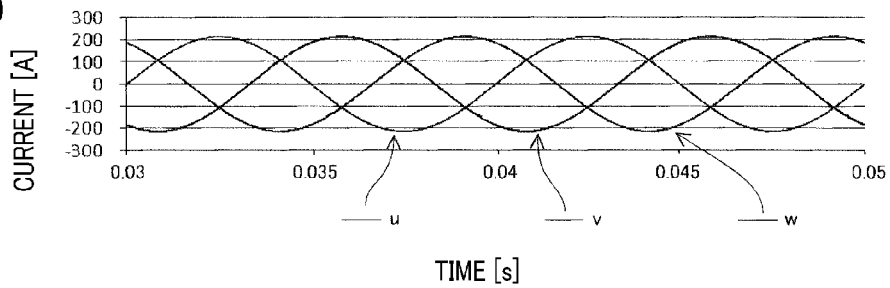
FIG. 6 is a waveform chart illustrating the resultant three-phase alternating current of the first three-phase alternating current supplied to the first stator coil and the second three-phase alternating current supplied to the second stator coil.

FIG. 6 shows the resultant current u of the U-phase current u1 supplied to the U-phase winding U1 of the first stator coil 12*a* and the U-phase current u2 supplied to the U-phase winding U2 of the second stator coil 12*b*, the resultant current v of the V-phase current v1 supplied to the V-phase winding V1 of the first stator coil 12*a* and the V-phase current v2 supplied to the V-phase winding V2 of the second stator coil 12*b*, and the resultant current w of the W-phase current w1 supplied to the W-phase winding W1 of the first stator coil 12*a* and the W-phase current w2 supplied to the W-phase winding W2 of the second stator coil 12*b*.

As can be seen from FIG. 6, the time-harmonic components of the U-phase, V-phase and W-phase currents u1, v1 and w1 supplied to the U-phase, V-phase and W-phase windings U1, V1 and W1 of the first stator coil 12*a* are respectively canceled by the time-harmonic components of the U-phase, V-phase and W-phase currents u2, v2 and w2 supplied to the U-phase, V-phase and W-phase windings U2, V2 and W2 of the second stator coil 12*b*. Consequently, it becomes possible to eliminate torque ripple caused by the time-harmonic components of the U-phase, V-phase and W-phase currents u1, u2, v1, v2, w1 and w2.

Next, the circuit configuration of the field winding synchronous machine drive system according to the present embodiment will be described with reference to FIG. 3.

As shown in FIG. 3, each of the first and second inverters 41*a* and 41*b* includes three upper arm units 411 and three lower arm units 411. Each of the upper and lower arm units 411 consists of an IGBT (Insulated Gate Bipolar Transistor) 411*a* and a freewheeling diode (or flyback diode) 411*b* that are connected in parallel with each other. In addition, it should be appreciated that other transistors, such as a MOSFET (Metal-Oxide-Semiconductor Field-Effect Transistor), may be used instead of the IGBT.

The alternating current induced in the main field windings 25 is half-wave rectified by a diode (rectifying element) 27 to magnetize the main poles 23 of the rotor core 21 so that for each circumferentially-adjacent pair of the main poles 23, one of the circumferentially-adjacent pair of the main poles 23 is magnetized into an N pole, while the other is magnetized into an S pole. Moreover, the half-wave rectified alternating current is smoothed by a smoothing capacitor 28, thereby being reduced in pulsation. In addition, a smoothing capacitor 412 is provided in the first drive unit 40*a* to smooth the electric power source 43*a*-side alternating current; and a smoothing capacitor 412 is provided in the second drive unit 40*b* to smooth the electric power source 43*b*-side alternating current.

A field circuit for creating field magnetic flux is formed of the excitation windings 26, a bridge circuit 34 and the main field windings 25. The excitation windings 26 are electrically connected with the main field windings 25 via the bridge circuit 34. The bridge circuit 34 is formed, for example, of diodes 35*a*-35*d* that are fixed to the rotor shaft 20*a*.

The bridge circuit 34 is configured to full-wave rectify excitation current induced in the excitation windings 26. Specifically, in the excitation windings 26 wound on the auxiliary poles 24 of the rotor core 21, there is induced the excitation current by q-axis harmonic magnetic flux that is created by q-axis components of the time-harmonic currents included in the first and second three-phase alternating currents supplied to the first and second stator coils 12*a* and 12*b*. The induced excitation current is then full-wave rectified by the bridge circuit 34 and applied to the main field windings 25. That is, the q-axis harmonic magnetic flux created by the q-axis components of the time-harmonic currents induces the excitation current in the excitation windings 26, and the excitation current is full-wave rectified by the bridge circuit 34 and supplied as field current to the main field windings 25. In addition, it should be appreciated that a half-wave rectification circuit may be used instead of the bridge circuit 34.

Between the bridge circuit 34 and the main field windings 25, there are provided both a switching element 36 and a smoothing capacitor 37. Specifically, the smoothing capacitor 37 is provided on the bridge circuit 34 side of the switching element 36 and in parallel with the main field windings 25. Moreover, the diode 27 is provided on the main field windings 25 side of the switching element 36. Consequently, a voltage required to excite the main field windings 25 is generated by the switching element 36 and the smoothing capacitor 37.

More specifically, in the present embodiment, when the voltage across the smoothing capacitor 37 has been developed to exceed a predetermined threshold voltage with the switching element 36 kept off, the switching element 36 is turned on, thereby securing and stabilizing the field current supplied to the main field windings 25.

Figure 7:
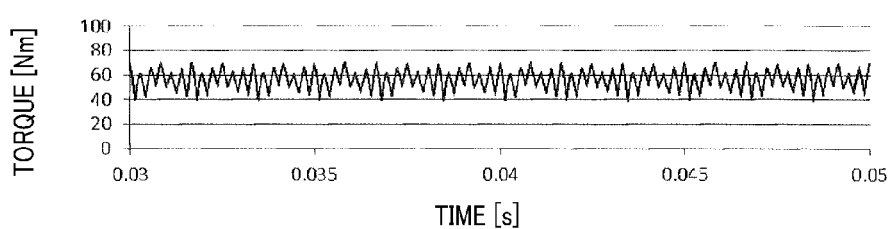
FIG. 7 is a waveform chart illustrating torque generated by the field winding synchronous machine according to the first embodiment.
Figure 8:
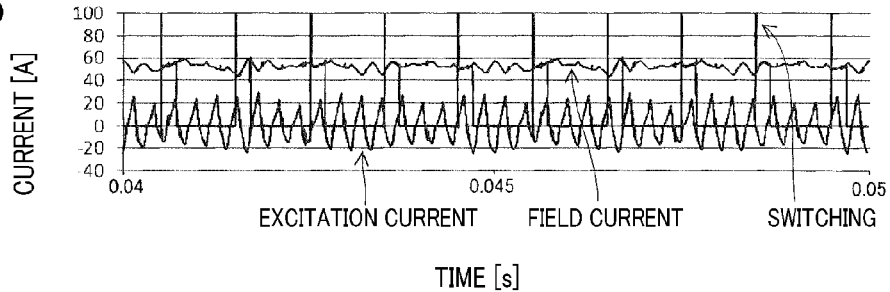
FIG. 8 is a waveform chart illustrating both excitation current induced in excitation windings of the rotor and field current that is obtained by rectifying the excitation current in one direction through a bridge circuit and supplied to main field windings of the rotor in the field winding synchronous machine drive system according to the first embodiment.

FIG. 7 shows the waveform of torque generated by the field winding synchronous machine 1 according to the present embodiment. FIG. 8 shows both the waveform of the excitation current induced in the excitation windings 26 and the waveform of the field current supplied to the main field windings 25.

The main field windings 25 have an inductance; therefore, to cause in a short time the field current to flow in the main field windings 25, it is required to apply a sufficiently-high voltage to the main field windings 25. In consideration of the above, in the present embodiment, the switching element 36 is first turned off to store electric charges in the smoothing capacitor 37, thereby developing the application voltage to the main field windings 25. When the application voltage (i.e., the voltage across the smoothing capacitor 37) has been developed to exceed the predetermined threshold voltage, the switching element 36 is turned on, allowing the developed application voltage to be applied to the main field windings 25. With the above configuration, it is possible to effectively increase the application voltage to the main field windings 25, thereby increasing the amount of the field current supplied to the main field windings 25.

In the present embodiment, the switching element 36 consists of an IGBT 36a and a freewheeling diode 36b. A controller (not shown) is further provided to control the on/off operation of the switching element 36 based on detection of the voltage across the smoothing capacitor 37, thereby controlling the amount of the field current supplied to the main field windings 25.

According to the present embodiment, it is possible to achieve the following advantageous effects.

In the present embodiment, the field winding synchronous machine drive system includes the field winding synchronous machine 1 and the drive apparatus 40. The field winding synchronous machine 1 includes the stator 10 and the rotor 20. The stator 10 includes the stator core 11 and the first and second three-phase stator coils 12a and 12b (i.e., N m-phase stator coils with N being equal to 2 and m being equal to 3) wound on the stator core 11 to create the rotating magnetic field. The rotor 20 includes the rotor core 21 and the main field windings 25 wound on the rotor core 21 to create the field magnetic flux. The drive apparatus 40 is configured to drive the field winding synchronous machine 1. The drive apparatus 40 includes the first and second inverters 41a and 41b (i.e., N inverters with N being equal to 2). The first inverter 41a supplies the first stator coil 12a with the first three-phase alternating current (i.e., first m-phase alternating current with m being equal to 3) that is comprised of the U-phase, V-phase and W-phase currents u1, v1 and w1. The second inverter 41b supplies the second stator coil 12b with the second three-phase alternating current (i.e., second m-phase alternating current with m being equal to 3) that is comprised of the U-phase, V-phase and W-phase currents u2, v2 and w2. Each of the U-phase, V-phase and W-phase currents u1, v1 and w1 of the first three-phase alternating current and the U-phase, V-phase and W-phase currents u2, v2 and w2 of the second three-phase alternating current includes fundamental-wave current and time-harmonic current superimposed on the fundamental-wave current; the time-harmonic current has a shorter period than the fundamental-wave current.

With the above configuration, it is possible to suitably set the phase differences between the time-harmonic currents included in the first three-phase alternating current and the time-harmonic currents included in the second three-phase alternating current, thereby causing them to be canceled by each other. Consequently, it is possible to reduce torque ripple caused by the time-harmonic currents included in the first and second three-phase alternating currents.

Moreover, in the present embodiment, the first and second three-phase alternating currents supplied respectively from the first and second inverters 41a and 41b to the first and second stator coils 12a and 12b are separately controlled. The time-harmonic currents included in the first three-phase alternating current and the time-harmonic currents included in the second three-phase alternating current are controlled in such phases as to be weakened by each other.

With the above configuration, it is possible to reduce the time-harmonic components of the resultant three-phase alternating current of the first and second three-phase alternating currents, thereby reducing ripple components of the stator field magnetic flux that is created by the resultant three-phase alternating current and thus the ripple components of torque generated by the field winding synchronous machine 1.

In the present embodiment, the rotor core 21 has the plurality of main poles 23 and the plurality of auxiliary poles 24 formed therein. The main poles 23 are formed to protrude toward the stator 10 and circumferentially spaced from one another at a predetermined pitch in electrical angle. The auxiliary poles 24 are formed to protrude toward the stator 10 and circumferentially offset from the main poles 23 by an electrical angle within a predetermined range which includes 90°. The rotor 20 includes the plurality of main field windings 25 and the plurality of excitation windings 26. The main field windings 25 are wound respectively on the main poles 23 of the rotor core 21 and connected in series with each other to create the field magnetic flux. The excitation windings 26 are wound respectively on the auxiliary poles 24 of the rotor core 21 and connected in series with each other to have the excitation current induced therein by the time-harmonic currents included in the first and second three-phase alternating currents. The excitation windings 26 are connected with the main field windings 25 via the bridge circuit 34.

With the above configuration, the excitation current, which is induced in the excitation windings 26 by the time-harmonic currents included in the first and second three-phase alternating currents, is rectified into direct current by the bridge circuit 34 and the obtained direct current is supplied as the field current to the main field windings 25. Therefore, by reducing ripple components of the excitation current, it is possible to further reduce torque ripple.

In the present embodiment, between the bridge circuit 34 and the main field windings 25, there is connected the smoothing capacitor 37 in parallel with the main field windings 25.

Consequently, with the smoothing capacitor 37, it is possible to absorb ripple components of the field current supplied to the main field windings 25, thereby further reducing torque ripple.

In the present embodiment, between the bridge circuit 34 and the main field windings 25, there is also connected the switching element 36.

Consequently, with the switching element 36, it is possible to supply the field current to the main filed windings 25 at a suitable voltage.

In the present embodiment, the switching element 36 is configured to be turned on when the voltage across the smoothing capacitor 37 exceeds the predetermined threshold voltage.

With the above configuration, it is possible to supply the field current to the main filed windings 25 at the predetermined threshold voltage, thereby causing in a short time the field current to flow in the main field windings 25. It is also possible to increase the amount of the field current supplied to the main field windings 25.

Next, two examples of suitably setting the phase difference between two time-harmonic currents included respectively in the first and second three-phase alternating currents will be described.

The two time-harmonic currents are in the form of a triangular wave in the first example and in the form of a sine wave in the second example. In addition, for the sake of convenience of explanation, one of the two time-harmonic currents will be referred to as reference wave and the other will be referred to as cancellation wave.

Triangular Wave (1) Cancellation Phase Shift of 180°

Figure 9A:
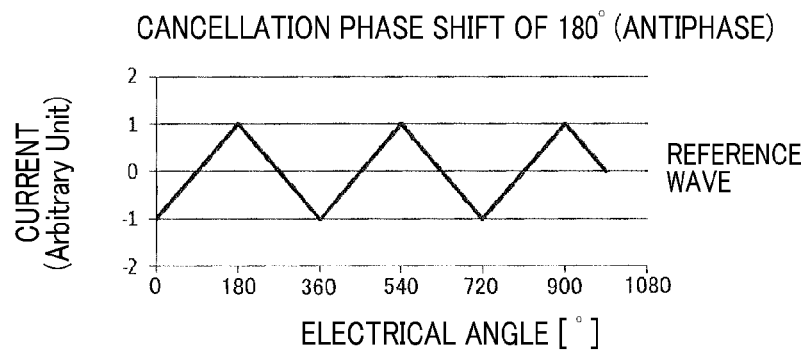
FIGS. 9A, 9B and 9C are waveform charts respectively illustrating a reference wave, a cancellation wave and a resultant wave of the reference and cancellation waves when both the reference wave and the cancellation wave are triangular waves and the cancellation phase shift (i.e., the phase shift of the cancellation wave from the reference wave) is equal to 180°.
Figure 9B:
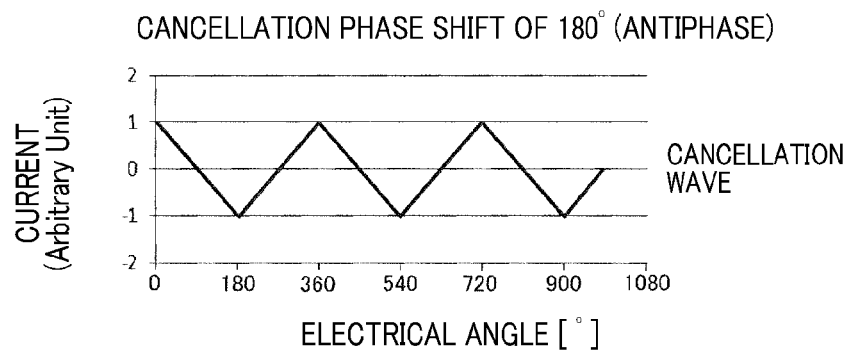
Figure 9C:
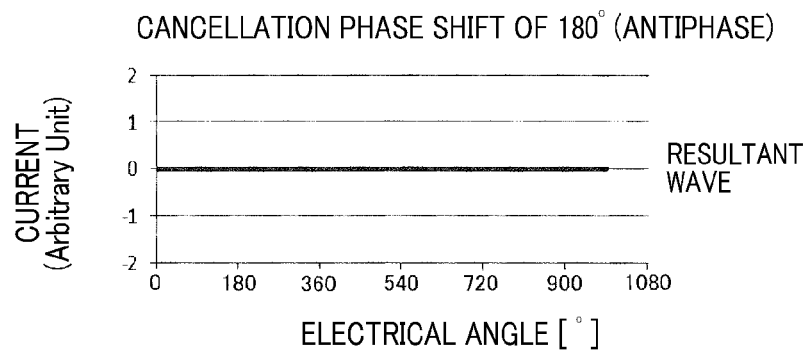

FIG. 9A shows the waveform of the reference wave. FIG. 9B shows the wave form of the cancellation wave that is shifted in phase from the reference wave by 180°. That is, the phase shift of the cancellation wave from the reference wave is equal to 180°. In other words, the reference wave and the cancellation wave are in antiphase. FIG. 9C shows the waveform of the resultant wave of the reference wave and the cancellation wave.

As seen from FIG. 9C, when the phase shift of the cancellation wave from the reference wave is equal to 180°, the peak value (or the amplitude) of the resultant wave is substantially equal to 0. In addition, the peak value of the reference wave and the peak value of the cancellation wave are equal to each other.

(2) Cancellation Phase Shift of 210°

Figure 10A:
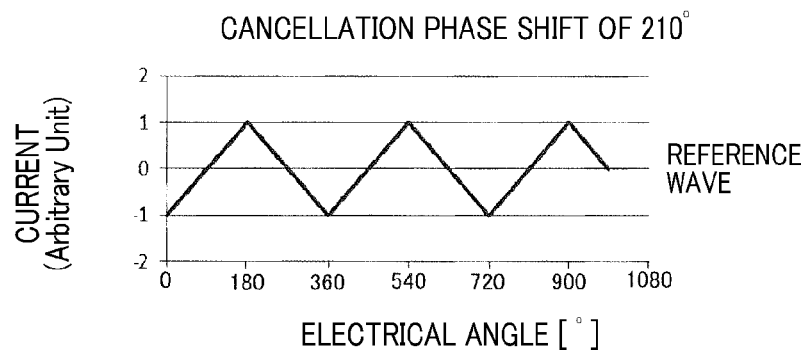
FIGS. 10A, 10B and 10C are waveform charts respectively illustrating a reference wave, a cancellation wave and a resultant wave of the reference and cancellation waves when both the reference wave and the cancellation wave are triangular waves and the cancellation phase shift is equal to 210°.
Figure 10B:
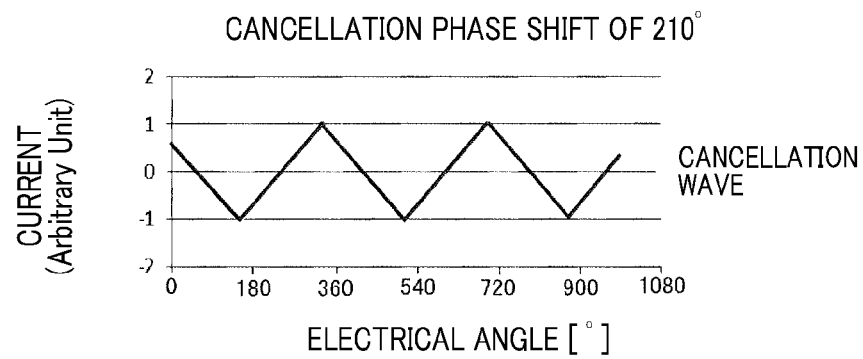
Figure 10C:
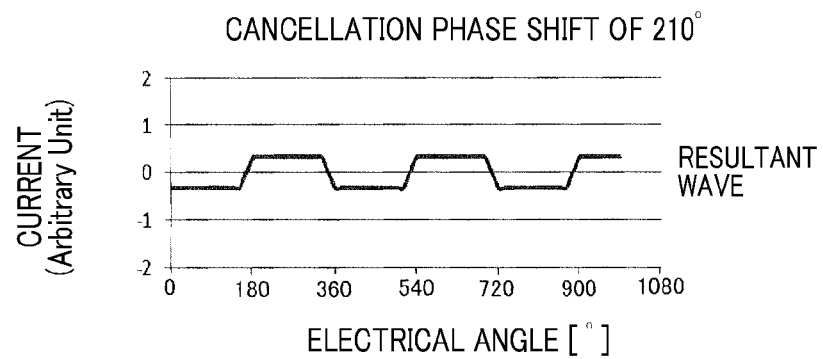

FIG. 10A shows the waveform of the reference wave. FIG. 10B shows the wave form of the cancellation wave that is shifted in phase from the reference wave by 210°. That is, the phase shift of the cancellation wave from the reference wave is equal to 210°. FIG. 10C shows the waveform of the resultant wave of the reference wave and the cancellation wave.

As seen from FIG. 10C, when the phase shift of the cancellation wave from the reference wave is equal to 210°, the peak value (or the amplitude) of the resultant wave is less than the peak value of the reference wave. In addition, the peak value of the reference wave and the peak value of the cancellation wave are equal to each other.

(3) Cancellation Phase Shift of 240°

Figure 11A:
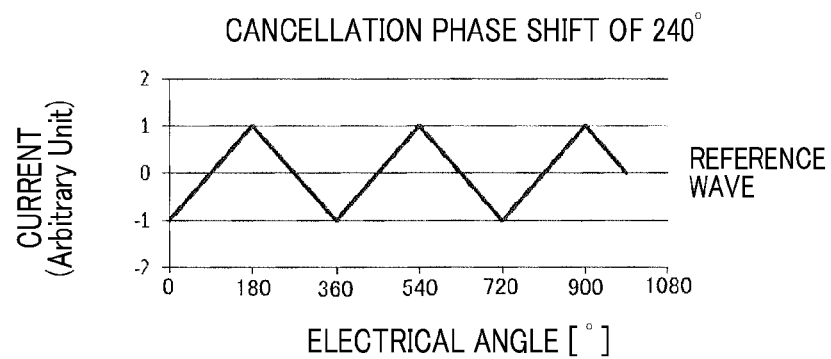
FIGS. 11A, 11B and 11C are waveform charts respectively illustrating a reference wave, a cancellation wave and a resultant wave of the reference and cancellation waves when both the reference wave and the cancellation wave are triangular waves and the cancellation phase shift is equal to 240°.
Figure 11B:
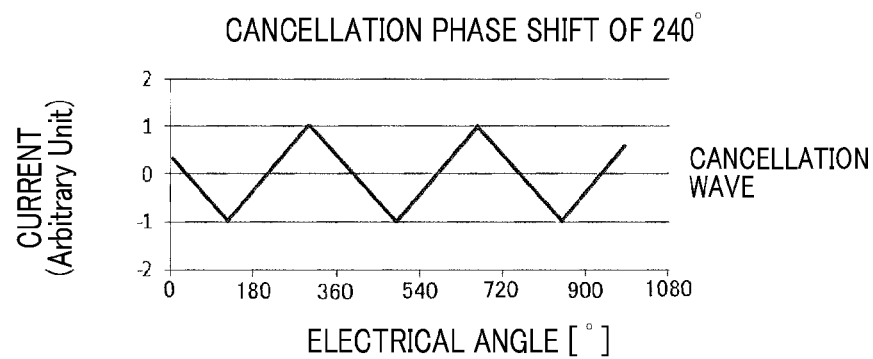
Figure 11C:
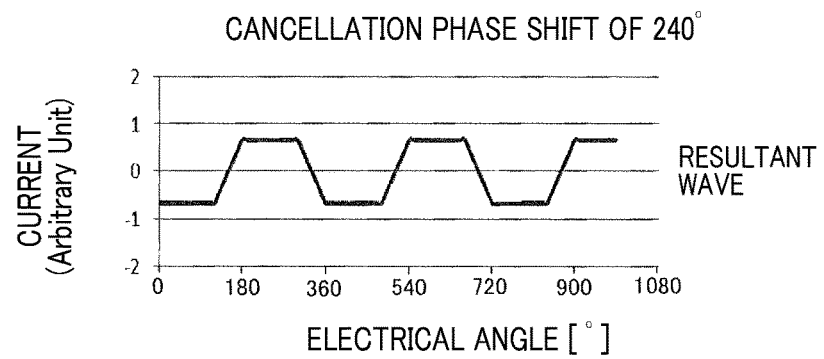

FIG. 11A shows the waveform of the reference wave. FIG. 11B shows the wave form of the cancellation wave that is shifted in phase from the reference wave by 240°. That is, the phase shift of the cancellation wave from the reference wave is equal to 240°. FIG. 11C shows the waveform of the resultant wave of the reference wave and the cancellation wave.

As seen from FIG. 11C, when the phase shift of the cancellation wave from the reference wave is equal to 240°, the peak value (or the amplitude) of the resultant wave is less than the peak value of the reference wave. In addition, the peak value of the reference wave and the peak value of the cancellation wave are equal to each other.

(4) Cancellation Phase Shift of 270°

Figure 12A:
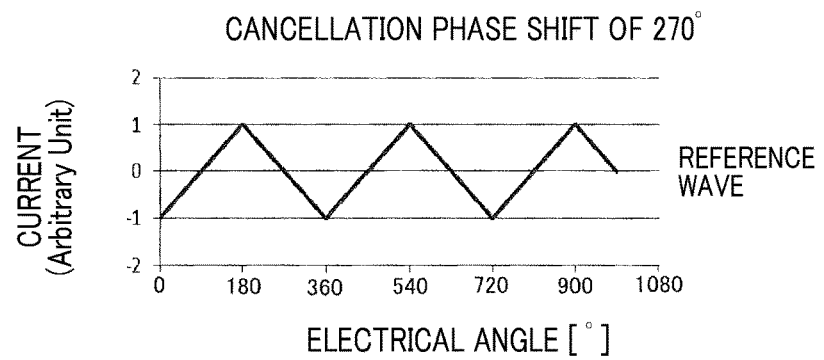
FIGS. 12A, 12B and 12C are waveform charts respectively illustrating a reference wave, a cancellation wave and a resultant wave of the reference and cancellation waves when both the reference wave and the cancellation wave are triangular waves and the cancellation phase shift is equal to 270°.
Figure 12B:
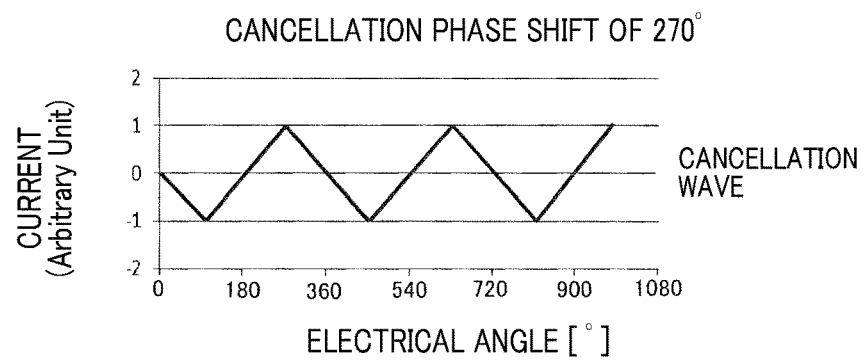
Figure 12C:
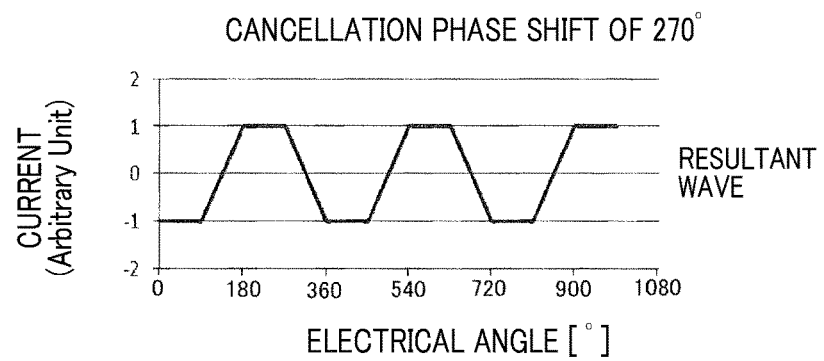

FIG. 12A shows the waveform of the reference wave. FIG. 12B shows the wave form of the cancellation wave that is shifted in phase from the reference wave by 270°. That is, the phase shift of the cancellation wave from the reference wave is equal to 270°. FIG. 12C shows the waveform of the resultant wave of the reference wave and the cancellation wave.

As seen from FIG. 12C, when the phase shift of the cancellation wave from the reference wave is equal to 270°, the peak value (or the amplitude) of the resultant wave is equal to the peak value of the reference wave. In addition, the peak value of the reference wave and the peak value of the cancellation wave are equal to each other.

From FIGS. 9A-12C, it can be seen that setting the phase shift of the cancellation wave from the reference wave to be in the range of greater than or equal to 180° and less than 270°, it is possible to have the peak value of the resultant wave less than the peak value of the reference wave.

Moreover, though not shown in the figures, the relative relation between the reference wave and the cancellation wave when the phase shift of the cancellation wave from the reference wave is in the range of greater than 90° and less than or equal to 180° is inverse to that when the phase shift is in the range of greater than or equal to 180° and less than 270°. For example, the relative relation between the reference wave and the cancellation wave when the phase shift of the cancellation wave from the reference wave is equal to 90° is inverse to the relative relation shown in FIGS. 12A-12C where the phase shift is equal to 270°. Therefore, it is possible to have the peak value of the resultant wave of the reference wave and the cancellation wave less than the peak value of the reference wave also when the phase shift of the cancellation wave from the reference wave is in the range of greater than 90° and less than or equal to 180°.

Accordingly, it can be seen that when the reference and cancellation waves are in the form of a triangular wave, it is possible to have the peak value of the resultant wave less than the peak value of the reference wave by setting the phase shift of the cancellation wave from the reference wave to be in the range of greater than 90° and less than 270°.

That is, for two time-harmonic currents included respectively in the first and second three-phase alternating currents, when the phase shift of one of the two time-harmonic currents from the other of the two time-harmonic currents is in the range of greater than 90° and less than 270°, the peak value of the resultant time-harmonic current of the two time-harmonic currents is lower the peak value of each of the two time-harmonic currents.

Sine Wave (1) Cancellation Phase Shift of 180°

Figure 13A:
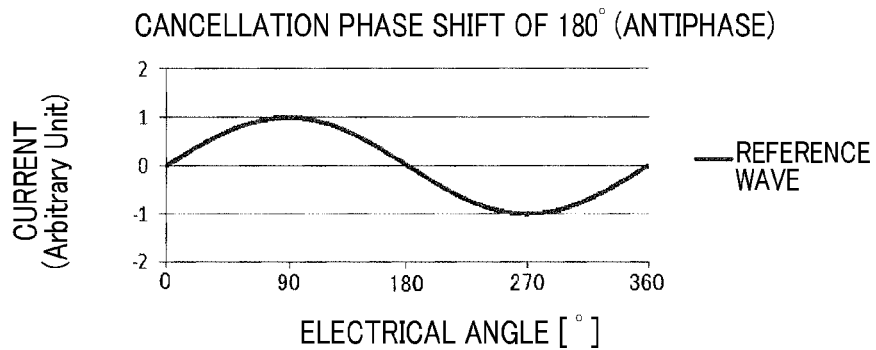
FIGS. 13A, 13B and 13C are waveform charts respectively illustrating a reference wave, a cancellation wave and a resultant wave of the reference and cancellation waves when both the reference wave and the cancellation wave are sine waves and the cancellation phase shift is equal to 180°.
Figure 13B:
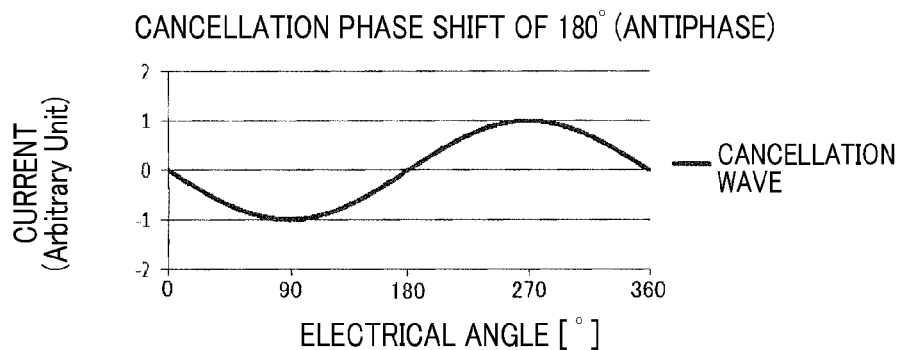
Figure 13C:
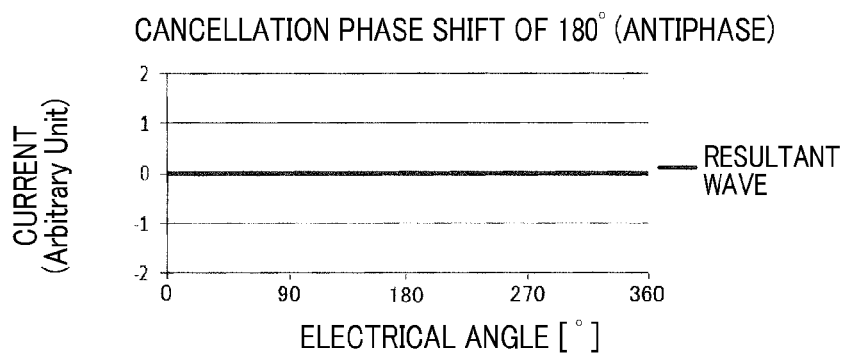

FIG. 13A shows the waveform of the reference wave. FIG. 13B shows the wave form of the cancellation wave that is shifted in phase from the reference wave by 180°. That is, the phase shift of the cancellation wave from the reference wave is equal to 180°. In other words, the reference wave and the cancellation wave are in antiphase. FIG. 13C shows the waveform of the resultant wave of the reference wave and the cancellation wave.

As seen from FIG. 13C, when the phase shift of the cancellation wave from the reference wave is equal to 180°, the peak value (or the amplitude) of the resultant wave is substantially equal to 0. In addition, the peak value of the reference wave and the peak value of the cancellation wave are equal to each other.

(2) Cancellation Phase Shift of 210°

Figure 14A:
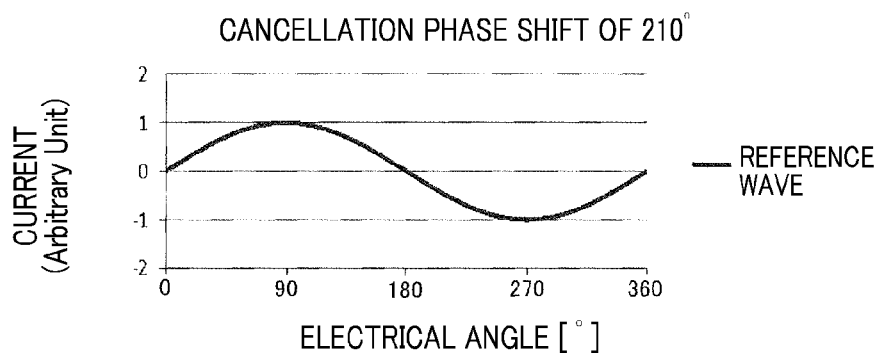
FIGS. 14A, 14B and 14C are waveform charts respectively illustrating a reference wave, a cancellation wave and a resultant wave of the reference and cancellation waves when both the reference wave and the cancellation wave are sine waves and the cancellation phase shift is equal to 210°.
Figure 14B:
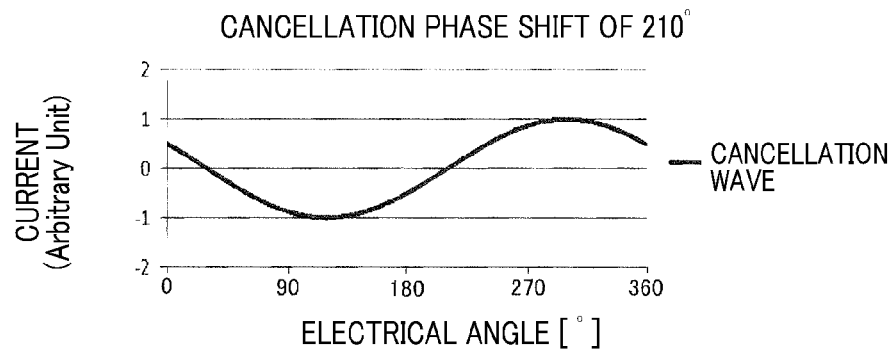
Figure 14C:
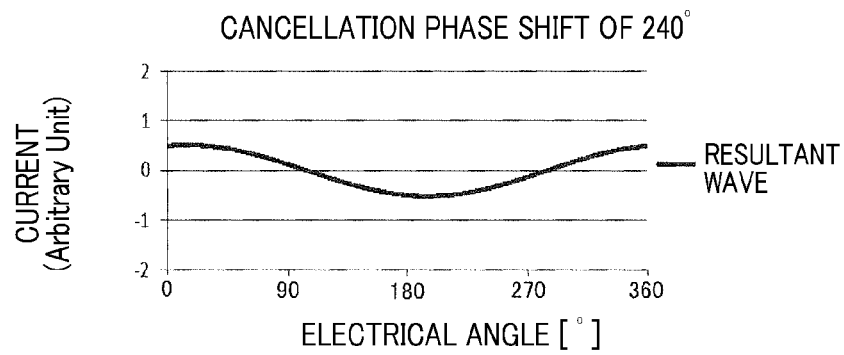

FIG. 14A shows the waveform of the reference wave. FIG. 14B shows the wave form of the cancellation wave that is shifted in phase from the reference wave by 210°. That is, the phase shift of the cancellation wave from the reference wave is equal to 210°. FIG. 14C shows the waveform of the resultant wave of the reference wave and the cancellation wave.

As seen from FIG. 14C, when the phase shift of the cancellation wave from the reference wave is equal to 210°, the peak value (or the amplitude) of the resultant wave is less than the peak value of the reference wave. In addition, the peak value of the reference wave and the peak value of the cancellation wave are equal to each other.

(3) Cancellation Phase Shift of 240°

Figure 15A:
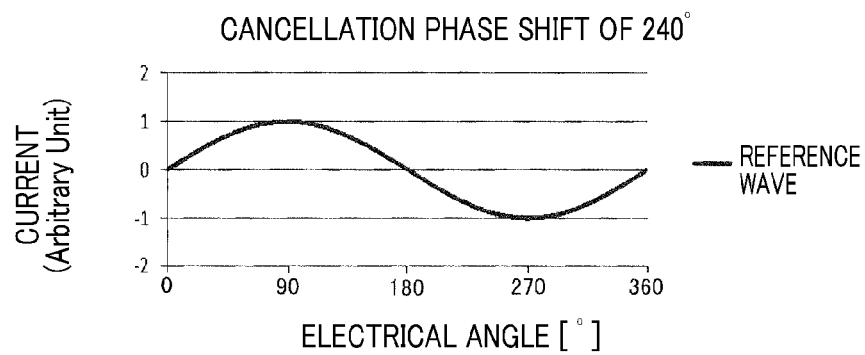
FIGS. 15A, 15B and 15C are waveform charts respectively illustrating a reference wave, a cancellation wave and a resultant wave of the reference and cancellation waves when both the reference wave and the cancellation wave are sine waves and the cancellation phase shift is equal to 240°.
Figure 15B:
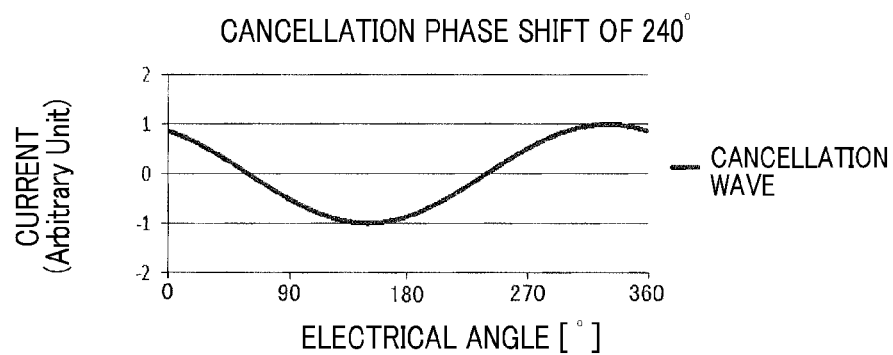
Figure 15C:
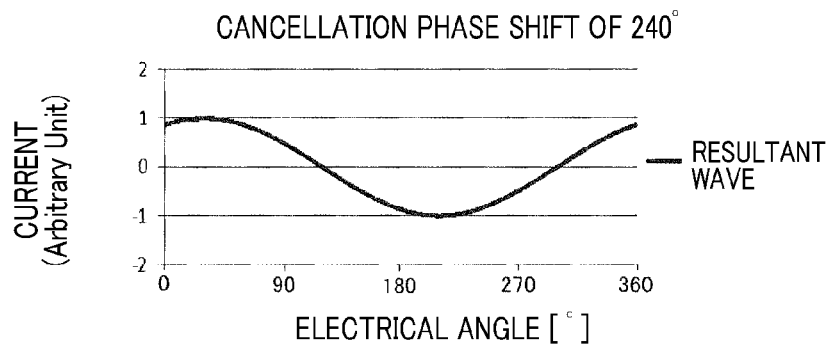

FIG. 15A shows the waveform of the reference wave. FIG. 15B shows the wave form of the cancellation wave that is shifted in phase from the reference wave by 240°. That is, the phase shift of the cancellation wave from the reference wave is equal to 240°. FIG. 15C shows the waveform of the resultant wave of the reference wave and the cancellation wave.

As seen from FIG. 15C, when the phase shift of the cancellation wave from the reference wave is equal to 240°, the peak value (or the amplitude) of the resultant wave is equal to the peak value of the reference wave. In addition, the peak value of the reference wave and the peak value of the cancellation wave are equal to each other.

(4) Cancellation Phase Shift of 270°

Figure 16A:
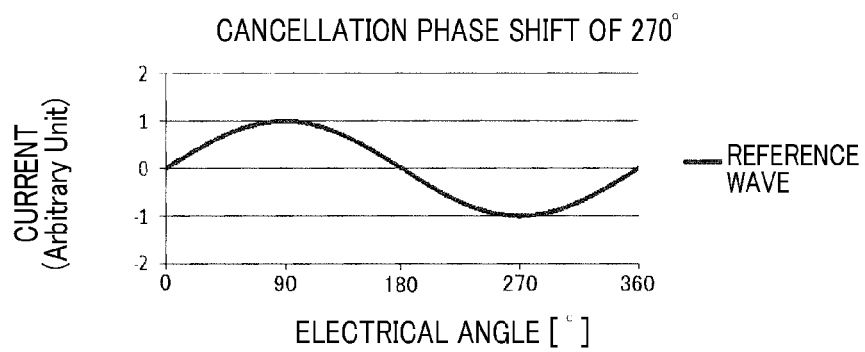
FIGS. 16A, 16B and 16C are waveform charts respectively illustrating a reference wave, a cancellation wave and a resultant wave of the reference and cancellation waves when both the reference wave and the cancellation wave are sine waves and the cancellation phase shift is equal to 270°.
Figure 16B:
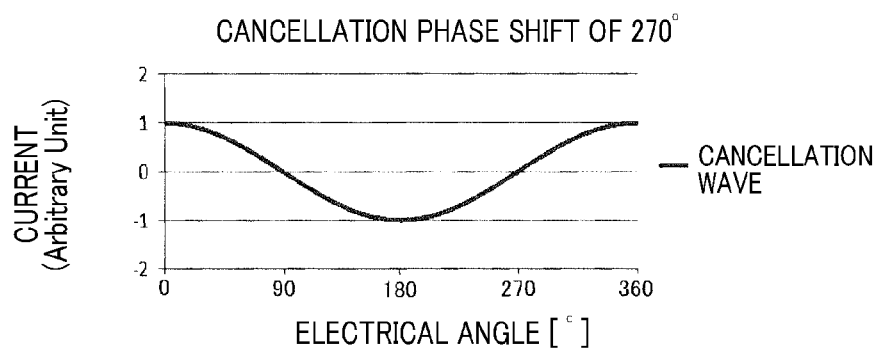
Figure 16C:
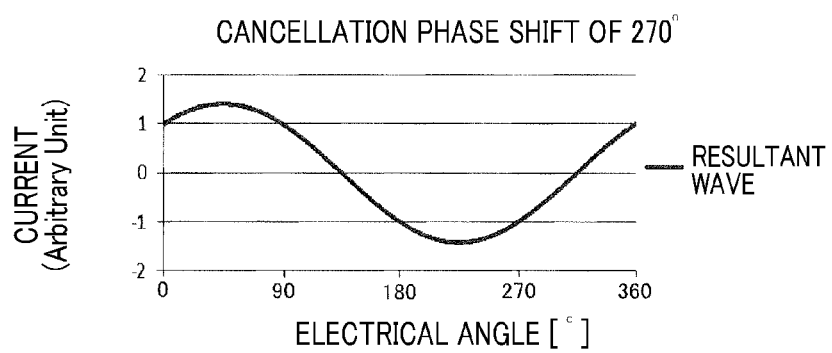

FIG. 16A shows the waveform of the reference wave. FIG. 16B shows the wave form of the cancellation wave that is shifted in phase from the reference wave by 270°. That is, the phase shift of the cancellation wave from the reference wave is equal to 270°. FIG. 16C shows the waveform of the resultant wave of the reference wave and the cancellation wave.

As seen from FIG. 16C, when the phase shift of the cancellation wave from the reference wave is equal to 270°, the peak value (or the amplitude) of the resultant wave is greater than the peak value of the reference wave. In addition, the peak value of the reference wave and the peak value of the cancellation wave are equal to each other.

From FIGS. 13A-16C, it can be seen that setting the phase shift of the cancellation wave from the reference wave to be in the range of greater than or equal to 180° and less than 240°, it is possible to have the peak value of the resultant wave less than the peak value of the reference wave.

Moreover, though not shown in the figures, the relative relation between the reference wave and the cancellation wave when the phase shift of the cancellation wave from the reference wave is in the range of greater than 120° and less than or equal to 180° is inverse to that when the phase shift is in the range of greater than or equal to 180° and less than 240°. For example, the relative relation between the reference wave and the cancellation wave when the phase shift of the cancellation wave from the reference wave is equal to 120° is inverse to the relative relation shown in FIGS. 15A-15C where the phase shift is equal to 240°. Therefore, it is possible to have the peak value of the resultant wave of the reference wave and the cancellation wave less than the peak value of the reference wave also when the phase shift of the cancellation wave from the reference wave is in the range of greater than 120° and less than or equal to 180°.

Accordingly, it can be seen that when the reference and cancellation waves are in the form of a sine wave, it is possible to have the peak value of the resultant wave less than the peak value of the reference wave by setting the phase shift of the cancellation wave from the reference wave to be in the range of greater than 120° and less than 240°.

That is, for two time-harmonic currents included respectively in the first and second three-phase alternating currents, when the phase shift of one of the two time-harmonic currents from the other of the two time-harmonic currents is in the range of greater than 120° and less than 240°, the peak value of the resultant time-harmonic current of the two time-harmonic currents is lower the peak value of each of the two time-harmonic currents.

Second Embodiment

This embodiment illustrates a field winding synchronous machine drive system which has almost the same configuration as the field winding synchronous machine drive system according to the first embodiment. Therefore, for the sake of avoiding redundancy, only the differences of the field winding synchronous machine drive system according to the present embodiment from that according to the first embodiment will be mainly described.

Figure 17:
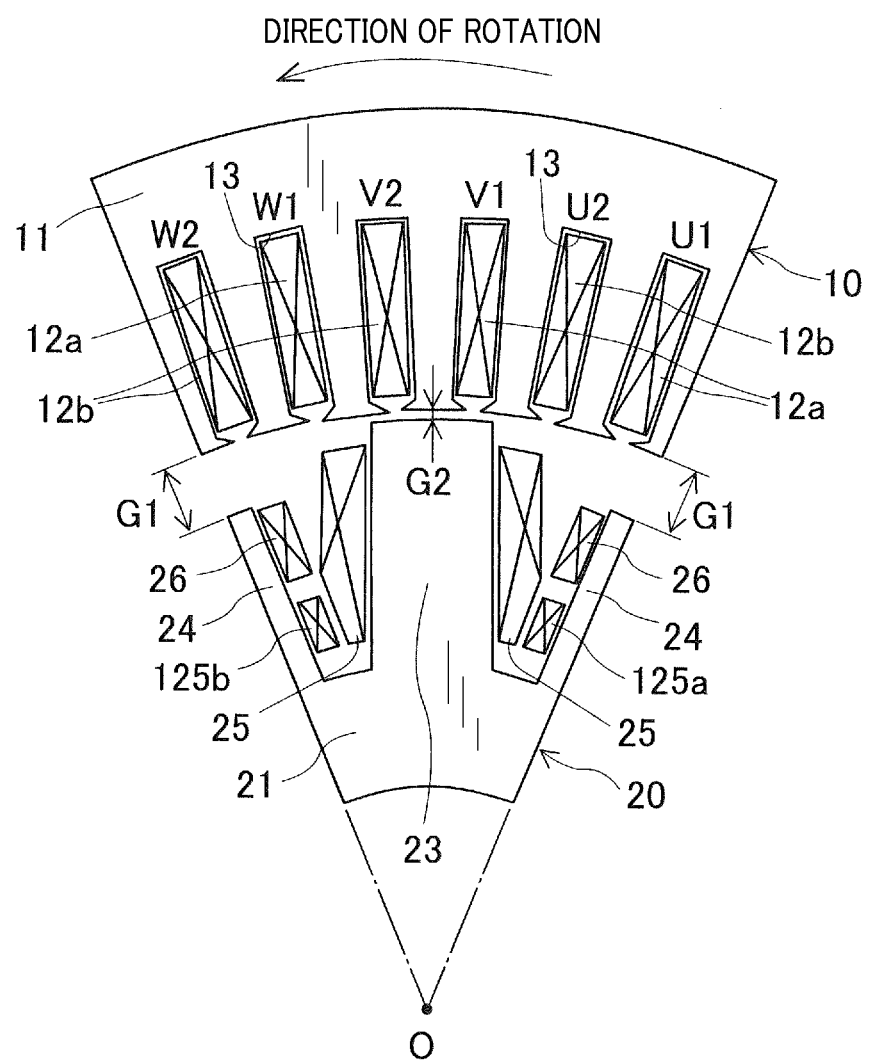
FIG. 17 is a schematic view showing part of a field winding synchronous machine according to a second embodiment, the part corresponding to one magnetic pole of a rotor of the field winding synchronous machine.

As shown in FIG. 17, in the present embodiment, the rotor 20 further includes a plurality of excitation resistance windings 125 (or 125a, 125b). Each of the excitation resistance windings 125 is wound on one of the auxiliary poles 24 of the rotor core 21 so as to be located radially inside (i.e., on the side of the axis O of rotation of the rotor 20) the excitation winding 26 wound on the auxiliary pole 24. Moreover, each of the excitation resistance windings 125 is located so as to be offset from one of the main poles 23 of the rotor core 21 in the retard direction by an electrical angle within a predetermined range which includes 90° and be magnetized into the same polarity as the main pole 23.

Figure 18:
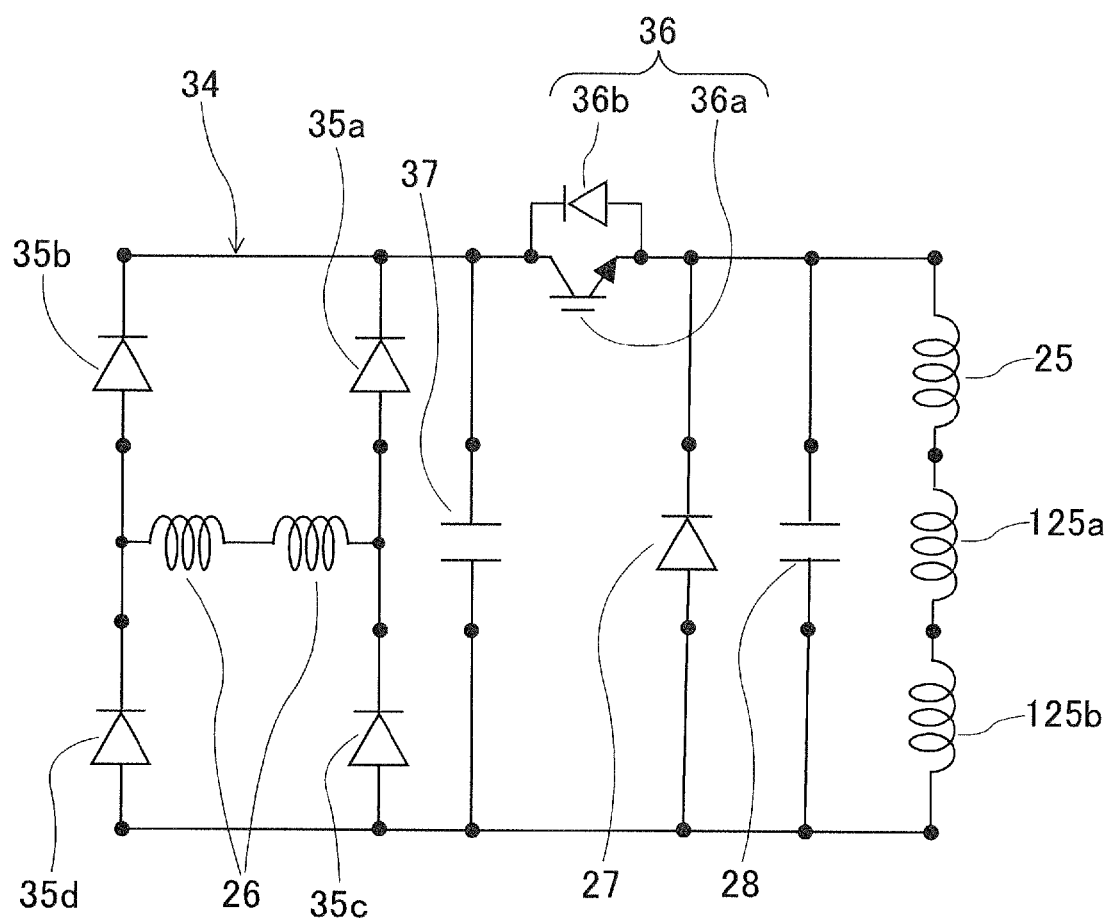
FIG. 18 is a schematic circuit diagram of a field circuit of a field winding synchronous machine drive system according to the second embodiment.

As shown in FIG. 18, the excitation resistance windings 125 are electrically connected in series with the main field windings 25. Moreover, the excitation resistance windings 125 are provided so as to impede, in proportion to increase in the field current flowing in the main field windings 25, the flow of the magnetic flux $\phi$ caused by the ampere-turns (i.e., main current) of the stator coil 12. More specifically, for each of the main field windings 25, the excitation resistance winding 125a located on one circumferential side of the main field winding 25 is wound in the same winding direction as the main field winding 25, whereas the excitation resistance winding 125b located on the other circumferential side of the main field winding 25 is wound in the opposite winding direction to the main field winding 25. Moreover, each of the excitation resistance windings 125a and 125b is wound to have a smaller number of turns than the main field winding 25.

According to the present embodiment, it is also possible to achieve the same advantageous effects as described in the first embodiment.

Moreover, according to the present embodiment, with the excitation resistance windings 125, during a high-load operation in which the field current flowing in the main field windings 25 is high, it is possible to impede the flow of the magnetic flux $\phi$ radially inward through the auxiliary poles 24, thereby more effectively relaxing (or suppressing) magnetic saturation of the auxiliary poles 24 on the radially inner side.

Other Embodiments

While the above particular embodiments have been shown and described, it will be understood by those skilled in the art that the present invention can also be embodied in various other modes without departing from the spirit of the present invention.

For example, in the above-described embodiments, the number of phases of the stator coils 12 is set to 3. However, the number of phases of the stator coils 12 may be set to any suitable integer M greater than or equal to 3.

Moreover, in the above-described embodiments, both the number of the stator coils 12 and the number of the inverters 41 are set to 2. However, both the number of the stator coils 12 and the number of the inverters 41 may be set to any suitable integer N greater than or equal to 2.

In addition, by increasing N (i.e., the number of the stator coils 12 and the number of the inverters 41), it is possible to: (1) realize more fine control of the time-harmonic currents; (2) reduce the capacities of elements of the inverters 41, thereby lowering the manufacturing cost; and (3) reduce the sizes of parts of the field winding synchronous machine drive system, thereby improving the productivity.

What is claimed is:

1. A field winding synchronous machine drive system comprising:
a field winding synchronous machine including a stator and a rotor, the stator including a stator core and N m-phase stator coils wound on the stator core to create a rotating magnetic field, where N is an integer greater than or equal to 2 and m is an integer greater than or equal to 3, the rotor including a rotor core and at least one main field winding wound on the rotor core to create field magnetic flux; and
a drive apparatus configured to drive the field winding synchronous machine, the drive apparatus including N inverters each of which supplies m-phase alternating current to a corresponding one of the N m-phase stator coils,
wherein
each of the inverters supplies the corresponding m-phase stator coil with the m-phase alternating current which includes a fundamental-wave current and a time-harmonic current superimposed on the fundamental-wave current, the time-harmonic current having a shorter period than the fundamental-wave current, and
the time-harmonic currents included in the respective m-phase alternating currents cause field current to flow in the at least one main field winding of the rotor, thereby creating the field magnetic flux.

2. The field winding synchronous machine drive system as set forth in claim 1, wherein the m-phase alternating currents supplied respectively from the inverters to the corresponding m-phase stator coils are separately controlled, and the time-harmonic currents included in the respective m-phase alternating currents are controlled in such phases as to be weakened by one another.

3. The field winding synchronous machine drive system as set forth in claim 2, wherein N is equal to 2,
both of the time-harmonic currents included respectively in the two m-phase alternating currents are in the form of a triangular wave, and
a phase shift of one of the two time-harmonic currents from the other of the two time-harmonic currents is in a range of greater than 90° and less than 270°.

4. The field winding synchronous machine drive system as set forth in claim 2, wherein N is equal to 2,
both of the time-harmonic currents included respectively in the two m-phase alternating currents are in the form of a sine wave, and
a phase shift of one of the two time-harmonic currents from the other of the two time-harmonic currents is in a range of greater than 120° and less than 240°.

5. The field winding synchronous machine drive system as set forth in claim 1, wherein a peak value of a resultant time-harmonic current of the N time-harmonic currents included respectively in the N m-phase alternating currents is lower than a peak value of each of the N time-harmonic currents.

6. The field winding synchronous machine drive system as set forth in claim 1, wherein the rotor core has a plurality of main poles and a plurality of auxiliary poles formed therein, the main poles being formed to protrude toward the stator and circumferentially spaced from one another at a predetermined pitch in electrical angle, the auxiliary poles being formed to protrude toward the stator and circumferentially offset from the main poles by an electrical angle within a predetermined range which includes 90°,
the rotor includes a plurality of main field windings and a plurality of excitation windings, the main field windings being wound respectively on the main poles of the rotor core and connected in series with each other to create the field magnetic flux, the excitation windings being wound respectively on the auxiliary poles of the rotor core and connected in series with each other to have excitation current induced therein by the time-harmonic currents included in the m-phase alternating currents, and
the excitation windings are connected with the main field windings via a bridge circuit.

7. The field winding synchronous machine drive system as set forth in claim 6, wherein between the bridge circuit and the main field windings, there is connected a capacitor in parallel with the main field windings.

8. The field winding synchronous machine drive system as set forth in claim 7, wherein between the bridge circuit and the main field windings, there is also connected a switch.

9. The field winding synchronous machine drive system as set forth in claim 8, wherein the switch is configured to be turned on when voltage across the capacitor exceeds a predetermined threshold voltage.

10. A field winding synchronous machine drive system comprising:
a field winding synchronous machine including a stator and a rotor, the stator including a stator core and N m-phase stator coils wound on the stator core to create a rotating magnetic field, where N is an integer greater than or equal to 2 and m is an integer greater than or equal to 3, the rotor including a rotor core and at least one main field winding wound on the rotor core to create field magnetic flux; and
a drive apparatus configured to drive the field winding synchronous machine, the drive apparatus including N inverters each of which supplies m-phase alternating current to a corresponding one of the N m-phase stator coils,
wherein
each of the inverters supplies the corresponding m-phase stator coil with the m-phase alternating current which includes a fundamental-wave current and a time-harmonic current superimposed on the fundamental-wave current, the time-harmonic current having a shorter period than the fundamental-wave current,
the m-phase alternating currents supplied respectively from the inverters to the corresponding m-phase stator coils are separately controlled, and the time-harmonic currents included in the respective m-phase alternating currents are controlled in such phases as to be weakened by one another,
N is equal to 2,
both of the time-harmonic currents included respectively in the two m-phase alternating currents are in the form of a triangular wave, and
a phase shift of one of the two time-harmonic currents from the other of the two time-harmonic currents is in a range of greater than 90° and less than 270°.

11. A field winding synchronous machine drive system comprising:
a field winding synchronous machine including a stator and a rotor, the stator including a stator core and N m-phase stator coils wound on the stator core to create a rotating magnetic field, where N is an integer greater than or equal to 2 and m is an integer greater than or equal to 3, the rotor including a rotor core and at least one main field winding wound on the rotor core to create field magnetic flux; and a drive apparatus configured to drive the field winding synchronous machine, the drive apparatus including N inverters each of which supplies m-phase alternating current to a corresponding one of the N m-phase stator coils, wherein each of the inverters supplies the corresponding m-phase stator coil with the m-phase alternating current which includes a fundamental-wave current and a time-harmonic current superimposed on the fundamental-wave current, the time-harmonic current having a shorter period than the fundamental-wave current, the m-phase alternating currents supplied respectively from the inverters to the corresponding m-phase stator coils are separately controlled, and the time-harmonic currents included in the respective m-phase alternating currents are controlled in such phases as to be weakened by one another, N is equal to 2, both of the time-harmonic currents included respectively in the two m-phase alternating currents are in the form of a sine wave, and a phase shift of one of the two time-harmonic currents from the other of the two time-harmonic currents is in a range of greater than 120° and less than 240°.

12. A field winding synchronous machine drive system comprising:

a field winding synchronous machine including a stator and a rotor, the stator including a stator core and N m-phase stator coils wound on the stator core to create a rotating magnetic field, where N is an integer greater than or equal to 2 and m is an integer greater than or equal to 3, the rotor including a rotor core and at least one main field winding wound on the rotor core to create field magnetic flux; and a drive apparatus configured to drive the field winding synchronous machine, the drive apparatus including N inverters each of which supplies m-phase alternating current to a corresponding one of the N m-phase stator coils, wherein each of the inverters supplies the corresponding m-phase stator coil with the m-phase alternating current which includes a fundamental-wave current and a time-harmonic current superimposed on the fundamental-wave current, the time-harmonic current having a shorter period than the fundamental-wave current, the rotor core has a plurality of main poles and a plurality of auxiliary poles formed therein, the main poles being formed to protrude toward the stator and circumferentially spaced from one another at a predetermined pitch in electrical angle, the auxiliary poles being formed to protrude toward the stator and circumferentially offset from the main poles by an electrical angle within a predetermined range which includes 90°, the rotor includes a plurality of main field windings and a plurality of excitation windings, the main field windings being wound respectively on the main poles of the rotor core and connected in series with each other to create the field magnetic flux, the excitation windings being wound respectively on the auxiliary poles of the rotor core and connected in series with each other to have excitation current induced therein by the time-harmonic currents included in the m-phase alternating currents, and the excitation windings are connected with the main field windings via a bridge circuit.

13. The field winding synchronous machine drive system as set forth in claim 12, wherein between the bridge circuit and the main field windings, there is connected a capacitor in parallel with the main field windings.

14. The field winding synchronous machine drive system as set forth in claim 13, wherein between the bridge circuit and the main field windings, there is also connected a switch.

15. The field winding synchronous machine drive system as set forth in claim 14, wherein the switch is configured to be turned on when voltage across the capacitor exceeds a predetermined threshold voltage.

* * * * *